(12) United States Patent
Rao et al.

(10) Patent No.: US 6,832,137 B2
(45) Date of Patent: Dec. 14, 2004

(54) LEAKY CABLE BASED METHOD AND SYSTEM FOR AUTOMOTIVE PARKING AID, REVERSING AID, AND PRE-COLLISION SENSING

(75) Inventors: Manoharprasad K. Rao, Novi, MI (US); Gary Steven Strumolo, Beverly Hills, MI (US); Kwaku O. Prakah-Asante, Commerce Township, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/249,549

(22) Filed: Apr. 17, 2003

(65) Prior Publication Data

US 2004/0210350 A1 Oct. 21, 2004

(51) Int. Cl.[7] .................................................. G06F 7/00
(52) U.S. Cl. ......................................................... 701/1
(58) Field of Search ......................... 701/1, 301; 342/27, 342/28

(56) References Cited

U.S. PATENT DOCUMENTS

| 5,534,869 | A | * | 7/1996 | Harman ........................ 342/27 |
| 6,034,642 | A | * | 3/2000 | Kojima et al. ................ 343/753 |
| 6,424,289 | B2 | * | 7/2002 | Fukae et al. ................... 342/27 |

* cited by examiner

Primary Examiner—Yonel Beaulieu

(57) ABSTRACT

A leaky cable object detection system (10) for a vehicle (12) includes a transmitter (20) coupled to a leaky cable antenna (29) and transmitting a first object detection signal (64). A receiver (26) is electronically coupled to the leaky cable antenna (29) and receives a second object detection signal (65) formed by reflection of the first object detection signal on an object (69). A controller (18) is electrically coupled to the transmitter (20) and the receiver (26) and generates a countermeasure signal in response to the second object detection signal (65).

20 Claims, 6 Drawing Sheets

LEAKY CABLE BASED METHOD AND SYSTEM FOR AUTOMOTIVE PARKING AID, REVERSING AID, AND PRE-COLLISION SENSING

BACKGROUND OF INVENTION

The present invention relates to parking-aid, reversing-aid, and pre-collision sensing systems for an automotive vehicle, and more particularly to a system and method of performing object detection for the stated systems utilizing leaky cable technology.

Parking-aid and reversing-aid systems are typically used in automotive industry and are becoming abundantly available in the market. Parking-aid systems and reversing-aid systems indicate to a vehicle operator that an object that may not be visible to the vehicle operator is within a stated distance of the vehicle. The vehicle operator may then respond accordingly.

Parking-aid systems are typically used to detect an object forward and rearward of a host vehicle. When the host vehicle is traveling in a forward direction at relatively slow velocities of approximately less than 10 kmph, the parking-aid system detects objects approximately within 1 m forward of the host vehicle. When the vehicle is in reverse gear, such that the vehicle is traveling in a rearward direction the parking-aid system typically detects objects ranging from within approximately 2 m of the host vehicle.

Reversing-aid systems detect objects only in the back of the vehicle. Reversing-aid systems are typically used to detect an object rearward of and within approximately 2 m of the host vehicle to approximately 5 m of the host vehicle, when the host vehicle is in a reverse gear. Thus, when the vehicle is in the reverse gear, a rearward sensing system operating in a reversing-aid mode covers the requirements for both reversing-aid and rearward parking-aid systems.

The parking-aid and reversing-aid systems commonly use multiple radar or ultrasonic sensors. Parking-aid systems typically utilize three or more sensors in the front of a vehicle. Parking-aid systems and reversing-aid systems commonly utilize two or more sensors in the rear of the vehicle.

When a radar sensor is used for parking-aid and reversing-aid applications, a radar frequency of approximately 24 GHz is commonly used. The radar sensors and accompanying electronics needed to operate at these high frequencies are relatively costly. In general the higher the operating frequency the more costly the components involved. Additionally, packaging these radar sensors in a vehicle can be a challenging task. Also, the radar sensors may become out of alignment over time and thus, degrade system performance.

Although, ultrasonic sensors are relatively less expensive than the radar sensors they tend to experience poor performance in adverse weather conditions, such as in raining or snowing conditions. The ultrasonic sensors, because of packaging requirements are aesthetically displeasing and negatively effect exterior appearance of a vehicle.

It is desirable, when designing a vehicle to minimize vehicle components, system complexity, and vehicle production and manufacturing costs. It is therefore also desirable to provide an object detection system that may be applied as a parking-aid and a reversing-aid but does not have the associated disadvantages with current parking-aid systems and reversing-aid systems and at the same time minimizes the amount of object detection sensors and costs involved therein.

SUMMARY OF INVENTION

The present invention provides a system and method of performing object detection within an automotive vehicle utilizing leaky cable technology. A leaky cable object detection system for a vehicle is provided. The system includes a transmitter coupled to a leaky cable antenna and transmitting a first object detection signal. A receiver is electronically coupled to the leaky cable antenna and receives a second object detection signal formed by reflection of the first object detection signal on an object. A controller is electrically coupled to the transmitter and the receiver and generates a slow vehicle traveling velocity countermeasure signal or a pre-collision countermeasure signal in response to the second object detection signal.

One of several advantages of the present invention is that it provides a parking-aid and reversing-aid system that utilizes leaky cable technology. In using leaky cable technology the present invention is relatively simple to implement, inexpensive to manufacture, and lightweight.

Another advantage of the present invention is that it is capable of operating in dual modes including a parking-aid mode or a reversing-aid mode and a pre-collision mode, thus minimizing number of components, costs, and weight.

Furthermore, the present invention provides a parking-aid and reversing-aid system that is accurate in various environments having adverse weather conditions.

Moreover, the present invention in being formed within a bumper of a vehicle cannot be visually seen on an exterior side of the vehicle and therefore does not aesthetically affect the appearance of a vehicle.

Yet another advantage of the present invention is that it incorporates an abundant amount of radiating elements, thereby increasing system reliability.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 1:
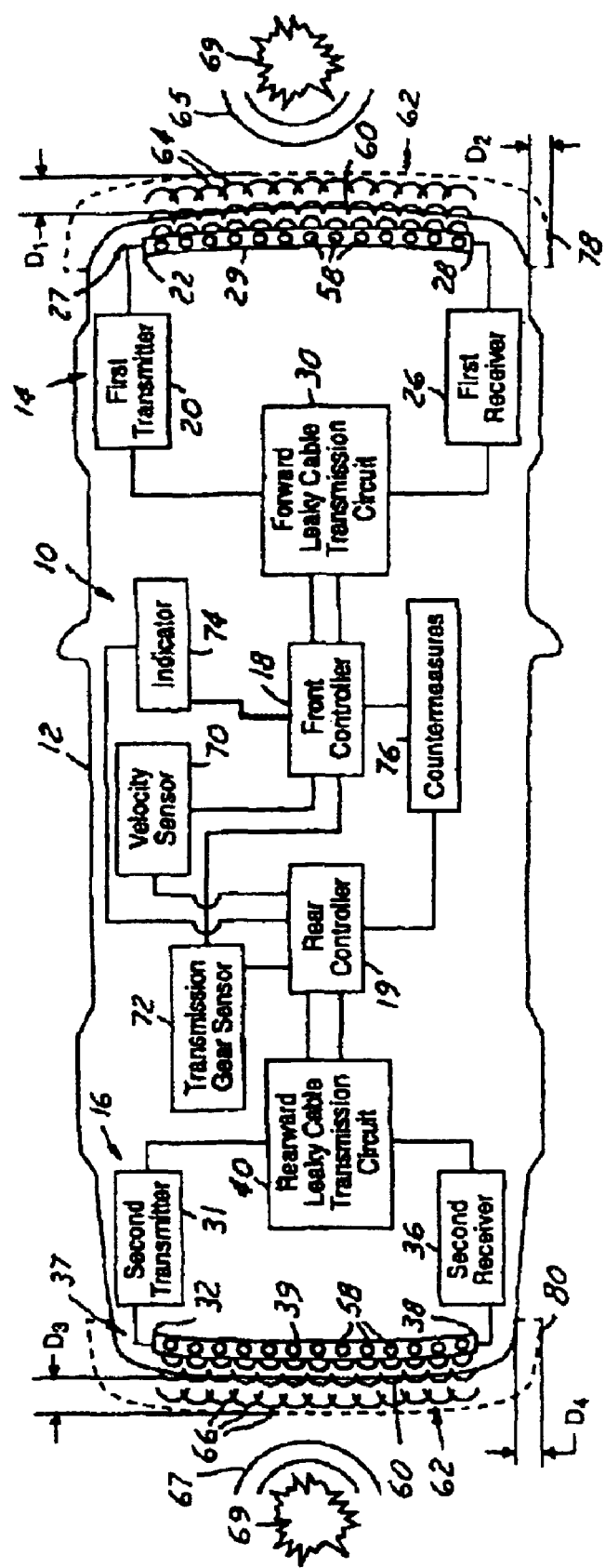
FIG. 1 is a block diagrammatic view of a leaky cable object detection system for a vehicle in accordance with an embodiment of the present invention.

Leaky cable technology has been used mainly in residential and commercial surveillance systems and to at least some extent has been suggested for use in pre-collision sensing. Leaky cable refers to cable having multiple electro-magnetic radiating elements along a length of the cable. Pre-collision sensing refers to forward and rearward object detection for relatively earlier deployment or tensioning of safety restraints such as airbags and reversible seat belt pretensioners during relatively higher traveling velocities or relative impact velocities of approximately greater than 10 kmph.

Leaky cable technology allows for object detection coverage over large distances. In surveillance systems the leaky cable is stationary and is used to detect objects that enter a determined range of the cable. For example, a leaky cable may extend along a perimeter or fence line surrounding a protected area and detect objects that come within a determined distance of that fence line.

Leaky cable is relatively inexpensive, lightweight, and is less susceptible to environment effects, as it is based on high frequency electro-magnetic radiation.

In the following figures the same reference numerals will be used to refer to the same components. While the present invention is described with respect to a system and method of performing object detection near a vehicle utilizing leaky cable technology, the present invention may be adapted and applied to various systems including: collision warning systems, collision avoidance systems, parking-aid systems, reversing-aid systems, passive countermeasure systems, vehicle systems, or other systems that may require collision avoidance or assessment.

In the following description, various operating parameters and components are described for multiple constructed embodiments. These specific parameters and components are included as examples and are not meant to be limiting.

Also, in the following description, the term slow vehicle traveling velocity refers to a vehicle traveling at velocities less than or equal to approximately 10 kmph.

Additionally, in the following description, the term "performing" may include activating, deploying, initiating, powering, and other terms known in the art that may describe the manner in which a countermeasure may be operated.

As well, in the following description, various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Moreover, a countermeasure signal may include information pertaining to the above stated reversible and irreversible countermeasures or may include other information, such as collision warning information, and parking-aid or reversing-aid countermeasure information. For example, the countermeasure signal may contain object detection information, which may be used to indicate to a vehicle operator the presence or close proximity of a detected object.

Referring now to FIG. 1, a block diagrammatic view of a leaky cable object detection system 10 for an automotive vehicle 12 in accordance with an embodiment of the present invention is shown. The system 10 includes a forward leaky cable system 14 for forward object detection and a rearward leaky cable system 16 for rearward object detection, with a separate front controller 18 and a rear controller 19. The first leaky cable system 14 includes a first transmitter 20 coupled to a first end 22 and a first receiver 26 coupled to a second end 28 of a first leaky cable antenna 29, which is mounted in a forward portion 27 of the vehicle 12. The first transmitter 20 and the first receiver 26 are coupled to the front controller 18 via forward leaky cable transmission circuit 30. Similarly, the second leaky cable system 16 includes a second transmitter 31 coupled to a first end 32 and a second receiver 36 coupled to a second end 38 of a second leaky cable antenna 39, which is mounted in a rearward portion 37 of the vehicle 12. The leaky cable systems 14 and 16 are capable of operating in multiple detection modes. The second transmitter 31 and the second receiver 36 are coupled to the rear controller 19 via rearward leaky cable transmission circuit 40. The first system 14 is cable of operating in a parking-aid mode and a pre-collision mode and the second system 16 is capable of operating in a parking-aid mode, a reversing-aid mode, and in the pre-collision mode. The detection modes are further described below. The forward transmission circuit 30 and the rearward transmission circuit 40 are described in detail in FIGS. 3 and 4.

Detection mode performance depends upon a selected mode of operation and corresponding countermeasures to be performed. For example, in the parking-aid mode and in the reversing-aid mode it is preferred to detect positioning of objects with relatively higher accuracy as compared to in the pre-collision mode. In the pre-collision mode it is preferred to accurately detect relative velocities of objects with relatively higher accuracy for relatively larger distances and utilize a relatively quicker update rate at the expense of object positional measurement accuracy. Update rate referring to time between object detection signals, or sometimes referred to as a refresh rate. Thus, there exists a tradeoff between accurately measuring object positioning versus accurately measuring velocity of objects relative to the vehicle 12 and update rate.

The controllers 18, 19 to obtain an appropriate operating performance for a selected operating mode, at a selected operating frequency, may adjust accuracy of object position measurement, accuracy of object relative velocities measurement, and update rate. The controllers 18, 19 are preferably microprocessor based such as a computer having a central processing unit, memory (RAM and/or ROM), and associated input and output buses. The controllers 18 and 19 may be portions of a central vehicle main control unit, an interactive vehicle dynamics module, a restraints control module, a main safety controller, or may be stand-alone controllers as shown. The controllers 18, 19 determine which of the leaky cables 29, 39 or leaky cable systems 14, 16 to operate in the parking-aid mode, a reversing-aid mode, or a pre-collision mode. The parking-aid mode includes a forward parking-aid mode and a rearward parking-aid mode such that the system 10 is performing object detection in both the front and rear of the vehicle 12.

The controllers 18, 19 may also determine whether the leaky cable components 14, 16 or other system devices are malfunctioning and indicate to a vehicle operator corresponding information in that respect. When a system device is malfunctioning the controllers 18, 19 may disable other system or vehicle devices to prevent a device from performing inappropriately.

The leaky cable systems 14, 16 may be in multiple configurations. FIG. 1, illustrates one embodiment of the present invention, where the first leaky cable antenna 29 is used for forward object detection and the second leaky cable antenna 39 is used for rearward detection. The leaky cable antennas 29, 39 each have separate transmitters 20, 31, receivers 26, 36 and controllers 18, 19.

Figure 2:
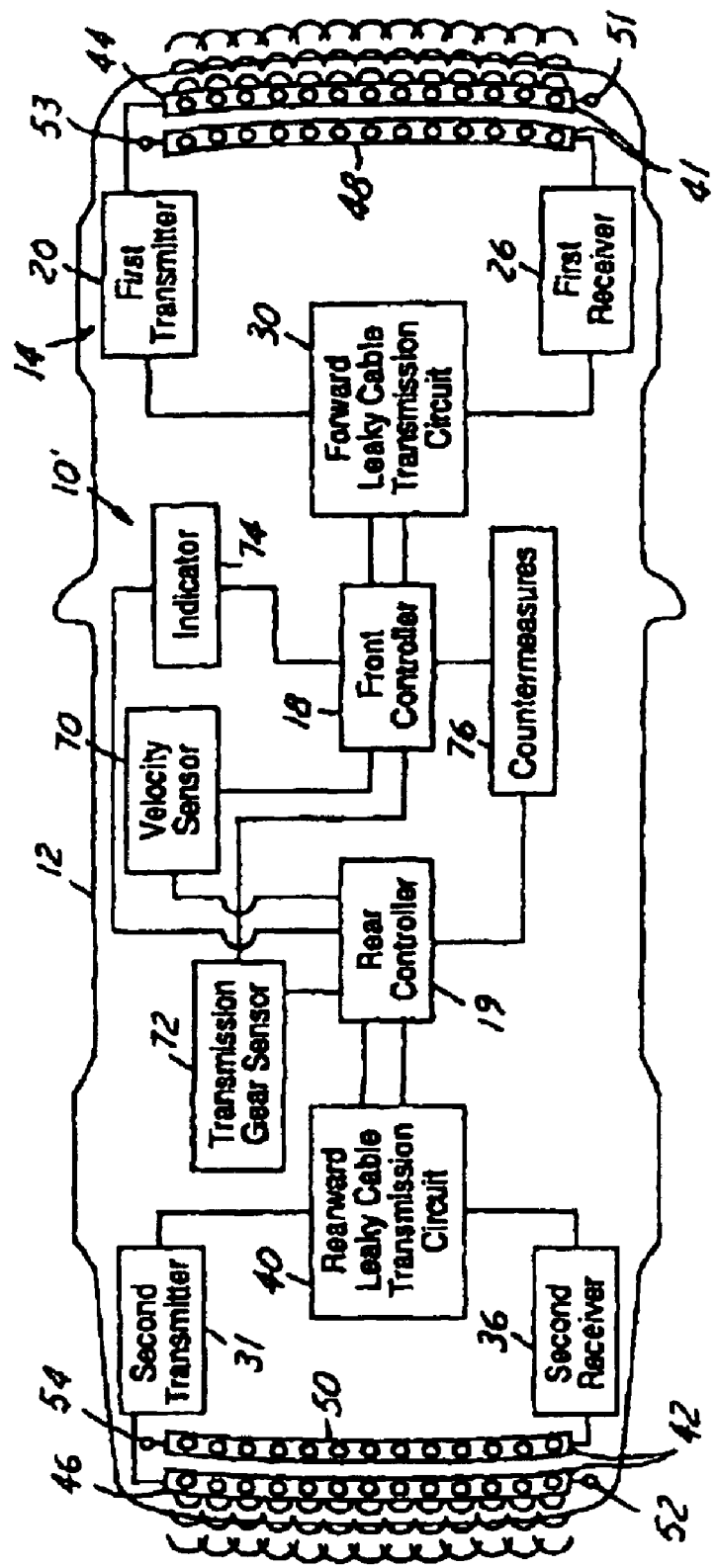
FIG. 2 is a block diagrammatic view of a leaky cable object detection system for a vehicle utilizing a pair of leaky cables for both forward and rearward object detection in accordance with another embodiment of the present invention.

FIG. 2, illustrates another embodiment of the present invention. A leaky cable object detection system 10' includes a first pair of leaky cables 41 that may be used in forward object detection and a second pair of leaky cables 42 that may be used for rearward object detection. The transmitters 20, 31 and receivers 26, 36 each having associated and separate leaky cables 44–50, respectively. In essence each pair of leaky cables, cables 41, 42, includes a transmitting leaky cable, cable 44, 46, and a receiving leaky cable, cable 48, 50, which are terminated in characteristic impedances of the cables 44–50 with appropriate terminators 51, 52, 53, and 54, respectively.

Referring again to FIG. 1, the leaky cable antennas 29, 39 have multiple electro-magnetic radiating elements 58. The elements 58 may be of various sizes, shapes, and may be in various style patterns. The leaky cables 29, 39 may be in the form of ported coaxial style cable or in other forms known in the art. The leaky cables 29, 39 are preferably directly coupled to and are formed or molded within bumpers 60 of the vehicle 12, such that they are not visible from an exterior side 62 of the vehicle 12. The leaky cables 29, 39 may be coupled to the vehicle 12 using various methods known in the art. At least a portion of the radiating elements 58 are mounted as to direct transmission of forward object detection signals 64 and rearward object detection signals 66 between the vehicle 12 and surrounding objects.

The transmitters 20, 31 transmit the object detection signals 64, 66 by means of the leaky cable antennas 29, 39 at selected frequencies. The object detection signals are reflected by one or more objects 69 of various sizes and shapes to form reflected object detection signals 65, 67 and are received by the receivers 26, 36 by the same or different leaky cable antenna as shown in FIGS. 1 and 2. The controllers 18 and 19 process the received or reflected object detection signals 65, 67. In processing the reflected object detection signals various object information including object relative range and velocity, as well as other object information known in the art may be determined. The transmitters 20, 31 and receivers 26, 36 may operate at any radio frequencies allowed for vehicular applications.

The controllers 18, 19 are also coupled to a vehicle velocity sensor 70, a transmission gear sensor 72, an indicator 74 and countermeasures 76. The controllers 18, 19 determine operating modes of the leaky cable circuits 14, 16 and determine whether to activate the countermeasures 76 or whether to indicate, via the indicator 74, to a vehicle operator various object and vehicle status information. Depending upon the vehicle 12 and object relative positions, velocities, and accelerations, the controllers 18 and 19 may determine whether to indicate to a vehicle operator, via the indicator 74, of a potential collision, or may determine to perform countermeasures 76. The controller 18, 19 in response to object information relative to the vehicle 12, signal one or more of the countermeasures 76, as needed, so as to prevent a collision or mitigate an injury.

The velocity sensor 70 may be of various forms, such as a transmission rotation sensor, a wheel speed sensor, an optical sensor, or other velocity sensor known in the art. The velocity sensor 70 determines the traveling speed of the vehicle 12 and generates a velocity signal.

The gear sensor 72 may also be of various forms. The gear sensor 72 may be in the form of a switch, a solenoid, a motion sensor, an encoder, or in another form known in the art. The gear sensor 72 determines the operating gear of the vehicle 12 and generates a gear signal. Note the gear sensor 72 may detect an operating gear of a conventional mechanical transmission or may correspond to an operating range of an electronic transmission.

Indicator 74 is used to signal or indicate a collision-warning signal or an object identification signal in response to the object detection signals. The Indicator 74 may include a video system, an audio system, an LED, a light, global positioning system, a heads-up display, a headlight, a taillight, a display system, a telematic system or other indicator. The indicator 74 may supply warning signals, collision-related information, external-warning signals to objects or pedestrians located outside of the vehicle 12, or other pre and post collision information.

The countermeasures 76 may include passive countermeasures such as pre-arming airbags, activating a reversible seatbelt pre-tensioner, or activating a headrest mechanism. Countermeasures 76 may also include brake control, throttle control, steering control, suspension control, transmission control, other chassis control systems, and other passive or active countermeasures known in the art.

The parking-aid mode consists of a forward detection mode and a rearward detection mode. The rearward detection mode is similar to the reversing-aid mode. The forward detection mode refers to monitoring a forward sensing zone having a sensing distance $D_1$ of approximately up to 1 meter. During the forward parking-aid mode the first leaky cable 29 detects an object within a forward-sensing zone 78 that may have a lateral sensing distance $D_2$ that is approximately equal to 0.5 m. The reward detection mode refers to monitoring a rearward-sensing zone 80 having a sensing distance $D_3$ of approximately up to 2.0 m to 5.0 m. For rearward sensing the second leaky cable 39 may detect an object within the rearward-sensing zone 80 that may have a lateral sensing distance $D_4$ also approximately equal to 0.5 m.

Of course, for simplicity and cost reduction, the present invention may be modified and simplified so as to have a reduced number of components and operate in a reduced number of modes. For example, the system 10 may be simplified to not include the leaky cable system 14 and operate only in the reversing-aid mode and in a rear pre-collision mode, which is similar to the pre-collision mode but only applies for areas rearward of the vehicle.

Figure 3:
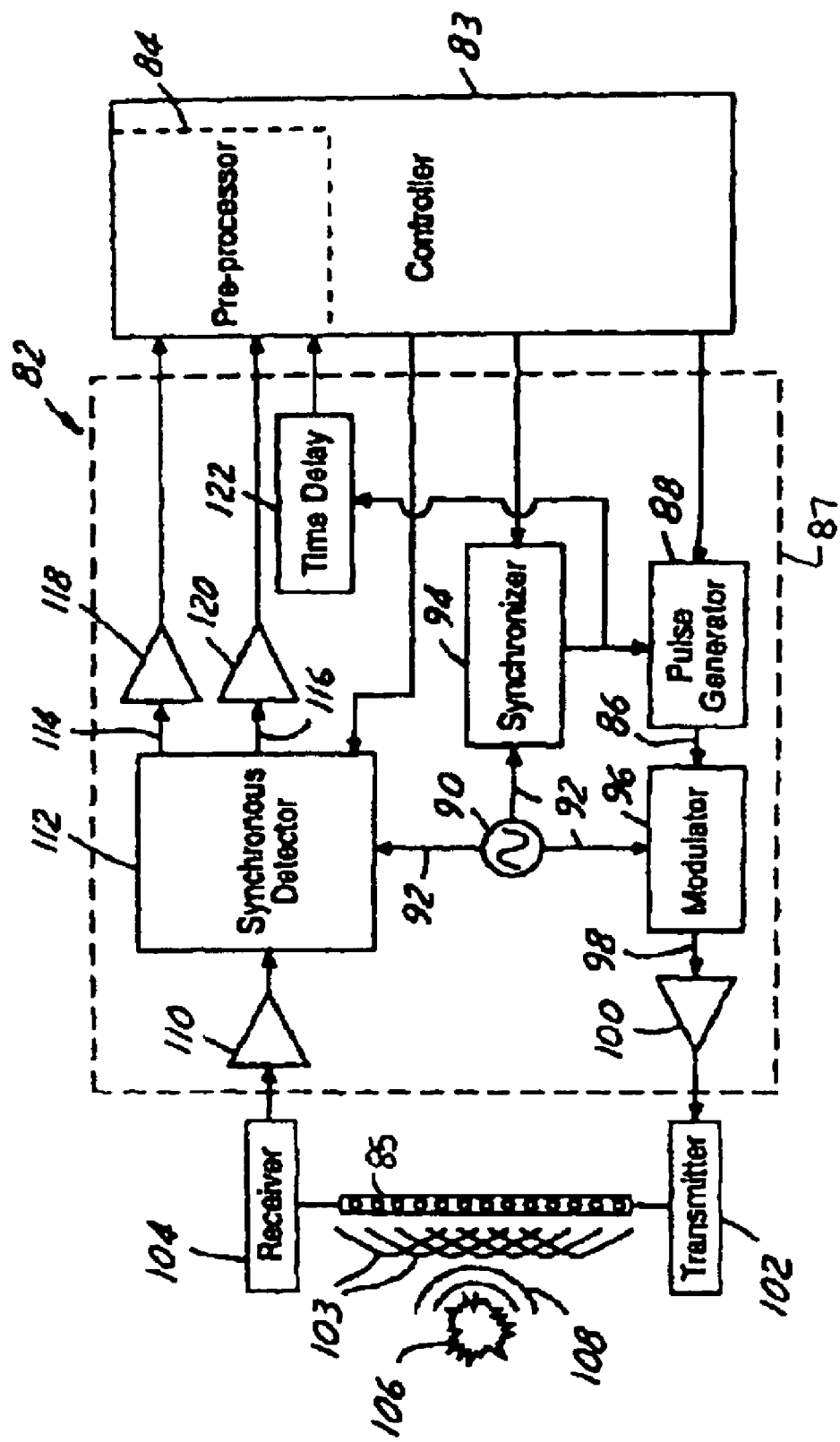
FIG. 3 is a block diagrammatic view of a leaky cable transmission system in accordance with embodiments of the present invention.

Referring now to FIG. 3, for simplicity of description of the leaky cable systems 14, 16, a single leaky cable system 82 is illustrated and described below in accordance with embodiments of the present invention. Also, a transmission circuit 87, although shown for a pulsed Doppler transmission system, may be modified for a continuous wave transmission system. The present invention preferably operates within a narrow frequency band and has Doppler frequency measurement and variable pulse width capabilities.

The leaky cable system 82 is controlled by a controller 83, which is similar to the controllers 18 and 19. The controller 83 includes a pre-processor 84. The controller 83 controls transmission and reception of RF (Radio Frequency) pulses to and from a leaky cable antenna 85. Although, the leaky cable antenna 85 is shown as a single leaky cable, a pair of leaky cables may be utilized, such as used in the embodiment of FIG. 2. The controller 83 in response to the velocity signal and the gear signal generates variable pulse width object detection signals 86 via the pulse generator 88. The object detection signals 86 correspond to the parking-aid mode, the reversing-aid mode, and the pre-collision mode and are modulated over a base carrier frequency.

A master oscillator 90 continuously generates an oscillating signal 92, which is utilized by a synchronizer 94 and a modulator 96 in transmitting the modulated object detection signals 98. The synchronizer 94 and the controller 83 synchronize the transmission of the pulsed signals 86. The modulator 96 in response to the oscillating signal 92 and the pulsed object detection signals 86 generates a modulated object detection signal 98 for amplification and transmission thereof via a first amplifier 100 and a transmitter 102, represented by arcs 103.

A receiver 104 receives the modulated object detection signals 98 after reflection on one or more objects 106, via the leaky cable 85, for further processing of the reflected object detection signals 108. The reflected object detection signals 108 are amplified by a second amplifier 110 and demodulated through a synchronous detector 112. The synchronous detector 112 is coupled to the controller 83 and the oscillator 90. The synchronous detector 112 demodulates the reflected object detection signals 108. The synchronous detector 112 in response to the oscillating signal 92, and the reflected object detection signals 108 generates a demodulated signal having an in-phase (I)-component 114 and a quadrature (Q)-component 116. The I-component 114 and the Q-component 116 are amplified by a third amplifier 118 and a fourth amplifier 120, respectively, before processing by the pre-processor 84.

The pre-processor 84 is coupled to the synchronizer 94 via a time delay device 122. The time delay device 122 provides the pre-processor 84 with correlation timings for the demodulated signals. The pre-processor 84 samples, digitizes, filters, and analyzes the I-component 114 and the Q-component 116 to determine various object characteristics known in the art.

The object detection signals 98 are preferably transmitted and received in the C band or in a narrow band frequency range having a center frequency of approximately 5.8 GHz, which allows for short range tracking in vehicular applications. Also, for relatively lower velocity applications such as in the parking-aid mode and in the reversing-aid mode, the selected center frequency of 5.8 GHz provides desired distance resolution at moderate update rates and allows for relatively less expensive electronic components, as compared to typical higher operating frequencies of prior art systems.

Figure 4:
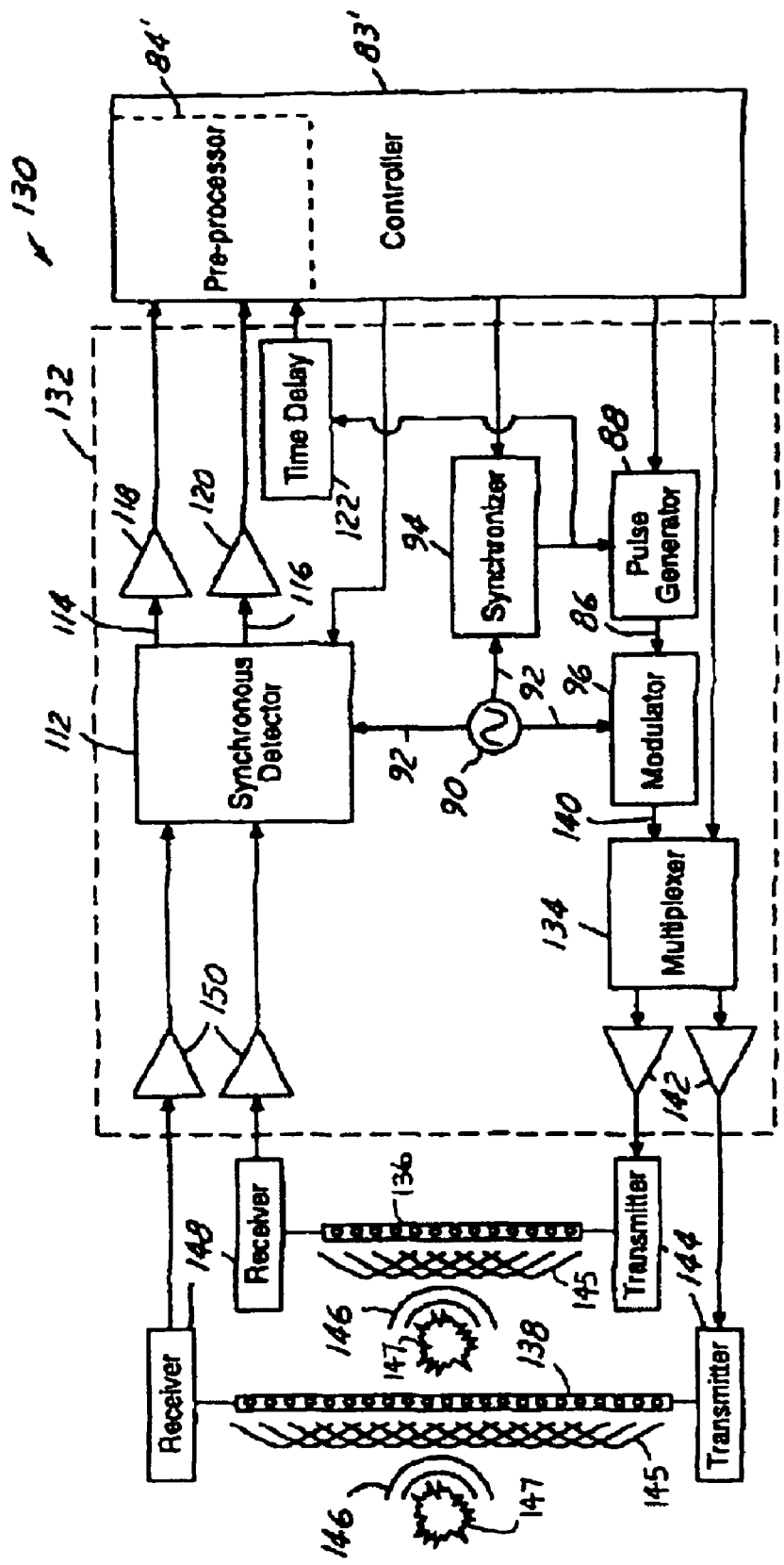
FIG. 4 is a block diagrammatic view of a leaky cable transmission system in accordance with other embodiments of the present invention.

Again, to minimize costs various system components may be shared and various component configurations may be utilized and apparent to one skilled in the art; FIG. 4 illustrates one possible example.

Referring now to FIG. 4, a block diagrammatic view of a leaky cable transmission system 130 in accordance with other embodiments of the present invention is shown. A single set of components or a single transmission circuit 132 is shared for both forward object detection and rearward object detection. In addition to the system components described above, with respect to the transmission system 82, the system 130 includes a multiplexer 134 coupled to a controller 83' and to the modulator 96. The controller 83' has a pre-processor 84'. The controller 83' switches between a forward leaky cable 136 and a rearward leaky cable 138 using the multiplexer 134. As with the system 82, modulated object detection signals 140 are amplified and transmitted over the leaky cables 136 and 138, via a respective first pair of amplifiers 142 and a pair of transmitters 144, represented by arcs 145. The modulated object detection signals are reflected off objects 147 to form reflected object detection signals 146 that are received by a pair of receivers 148 and a second pair of amplifiers 150 before demodulation thereof by the synchronous detector 112.

In operation, for example when the transmission gear signal indicates that a reverse gear (not shown) is engaged the controller 83', operates in the reversing-aid mode and uses the multiplexer 134 to transmit the object detection signals 140 via the rearward leaky cable 138 and does not transmit the object detection signals 140 via the forward leaky cable 136. Likewise, when the transmission gear signal indicates that the reverse gear is not engaged the controller 83' transmits the object detection signals 140 via the forward leaky cable 136 and not via the rearward leaky cable 138. Thus, the present invention may share a significant amount of components and yet provide multiple modes of operation in an efficient and cost effective manner. In an embodiment of the present invention when a reverse gear is engaged there is not any pre-collision mode coverage in a forward direction and when a reverse gear is not engaged there is no pre-collision mode coverage in a rearward direction.

Figure 5:
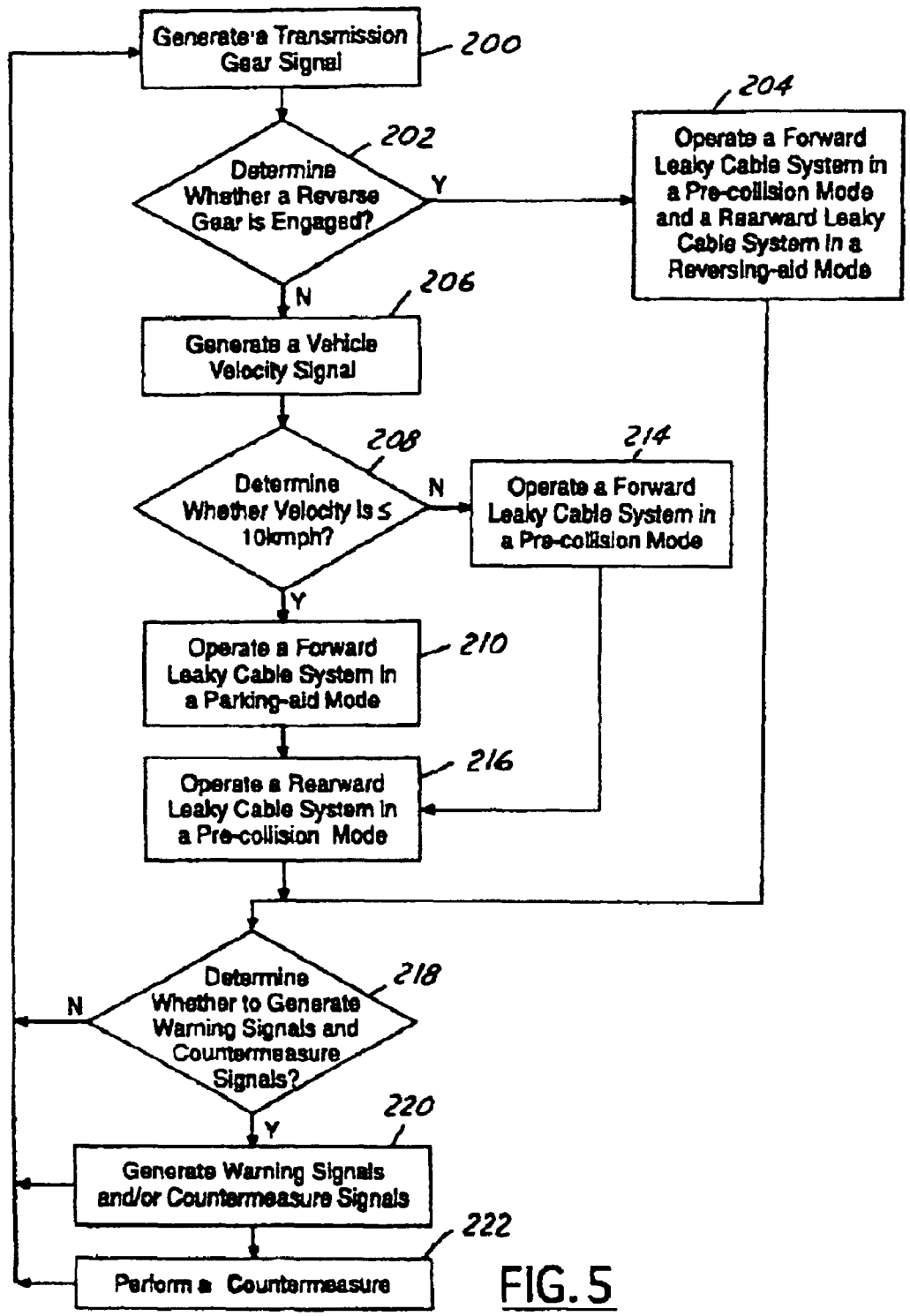
FIG. 5 is a logic flow diagram illustrating a method of performing object detection within a vehicle utilizing a leaky cable object detection system in accordance with multiple embodiments of the present invention.

Referring now to FIG. 5, a logic flow diagram illustrating a method of performing object detection within a vehicle 12 utilizing the system 10 in accordance with embodiments of the present invention is shown. Although the following steps are described in respect to the embodiment of FIG. 1, the steps may be utilized and modified for other embodiments of the present invention.

In step 200, the gear sensor 72 generates a gear signal representing a current operating gear. The vehicle 12 may be operating in a forward gear, a rearward gear, or a stationary gear. In step 202, the controllers 18, 19 determine whether the vehicle 12 is in a reverse gear in response to the gear signal.

In step 204, when a reverse gear is engaged, the controller 18 operates the forward leaky cable system 14 in the pre-collision mode and the controller 19 operates the rearward leaky cable system 16 in the reversing-aid mode. In step 206, when a reverse gear is not engaged, the controllers 18, 19 receive the vehicle velocity signal generated by the velocity sensor 70.

In step 208, the controllers 18, 19 determine when the vehicle velocity is less than 10 kmph. In step 210, when the vehicle velocity is less than 10 kmph, the front controller 18 may operate the forward leaky cable system 14 in the parking-aid mode. In step 214, when the vehicle velocity is greater than 10 kmph, the front controller 18 operates the forward leaky cable system 14 in the pre-collision sensing mode.

In step 216, whether the vehicle velocity is less than, equal to, or greater than 10 kmph the rear controller 19 operates the rearward leaky cable system 16 in the pre-collision sensing mode. In a preferred embodiment of the present invention steps 210 or 214 and step 216 are performed simultaneously.

In step 218, the controllers 18, 19 assess whether to generate warning signals or countermeasure signals in response to detection of objects. The warning signals and countermeasure signals may include a parking-aid warning signal, a reversing-aid warning signal, a pre-collision countermeasure signal, or a parking-aid warning signal or a reversing-aid warning signal and a pre-collision warning signal based on the object detection signals received by the leaky cable systems 14, 16. Of course, other warning signals and countermeasure signals may be generated. When the controllers 18, 19 determine that no warning signals or countermeasure signals are to be generated the controllers 18, 19 return operation to step 200. When warning signals or countermeasure signals are generated, the controllers 18, 19 proceeds to step 220.

In step 220, the controllers 18, 19 may generate warning signals or countermeasure signals in response to the above-stated assessment. The countermeasure signals may include a slow vehicle traveling velocity countermeasure signal, a parking-aid countermeasure signal, a reversing-aid countermeasure signal, a pre-collision countermeasure signal, or other countermeasure signal known in the art. In generating the warning signals and countermeasure signals the controllers 18, 19 may indicate to a vehicle operator object information of existing objects in sensing zones 78 and 80, so that the operator may respond accordingly. The warning signals may be audible or visual. When generating the warning signals, the controllers 18,19 may mute other vehicle audio systems, to provide clear alert potential collision and countermeasure information.

In step 222, the controllers 18, 19 may perform one or more of the countermeasures 76 in response to the countermeasure signals generated in step 220. For example, the controllers 18, 19 may activate a braking system (not shown), to slow the vehicle 12 to mitigate potential for injury to a vehicle occupant or to stop the vehicle 12 and prevent colliding with a detected object. Upon completion of steps 220 or 222 the controllers 18, 19 return to step 200.

Figure 6:
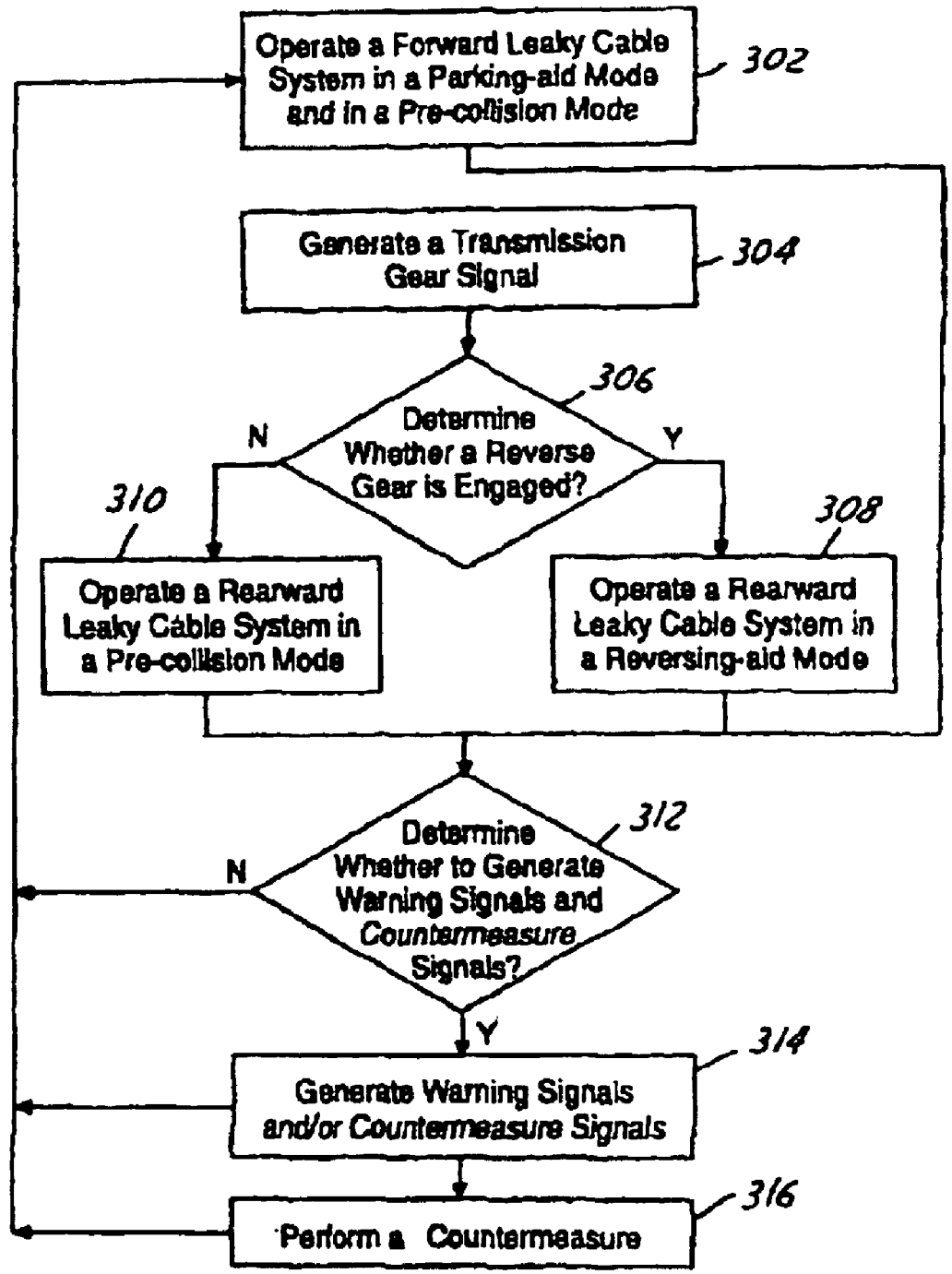
FIG. 6 is a logic flow diagram illustrating another method of performing object detection within a vehicle utilizing a leaky cable object detection system in accordance with multiple embodiments of the present invention.

Referring now to FIG. 6, a logic flow diagram illustrating another method of performing object detection within the vehicle 12 utilizing the system 10 in accordance with embodiments of the present invention is shown. Although the following steps are described in respect to the embodiment of FIG. 1, the steps may be utilized and modified for other embodiments of the present invention.

In step 302, the front controller 18 operates the forward leaky cable system 14 in both parking-aid mode and in the pre-collision mode. The front controller 18 may alter the object detection signals between the parking-aid mode and the pre-collision mode independent of the host vehicle speed. Object detection signals for both the parking-aid mode and the pre-collision mode are continuously assessed using the appropriate pulses. The update rate is equal to a sum of individual pulse times for each mode of operation. The controller 18 may proceed to step 312.

In step 304, as in step 200, the gear sensor 72 generates a gear signal representing a current operating gear. In step 306, as in step 202, the controller 19 determines whether the vehicle 12 is in a reverse gear in response to the gear signal. In step 308, when the reverse gear is engaged, the controller 19 operates the rearward leaky cable system 16 in the reversing-aid mode. In step 310, when the reverse gear is not engaged, the controller 19 operates the rearward leaky cable system 16 in the pre-collision mode.

In step 312, as with step 218, the controllers 18, 19 assess whether to generate warning signals or countermeasure signals in response to detection of objects. In step 314, as in step 220, the controllers 18, 19 may generate warning signals or countermeasure signals in response to the assessment in step 312. In step 316, as in step 222, the controllers 18, 19 may perform one or more of the countermeasures 76 in response to the countermeasure signals generated in step 314.

The above-described steps in FIGS. 5 and 6 are meant to be an illustrative example, the steps may be performed sequentially, synchronously, simultaneously, or in a different order depending upon the application.

The present invention provides a leaky cable object detection system for an automotive vehicle that is capable of operating in dual modes. Due to the electrical content and operating frequencies, the present invention is relatively inexpensive to manufacture and provides desired resolution for parking-aid, reversing-aid, and pre-collision sensing applications. Also, the present invention provides an object detection system that is relatively accurate in various adverse weather conditions due to interference disturbance rejection from use of leaky cable sensors.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A leaky cable object detection system for a vehicle comprising:

at least one transmitter coupled to at least one leaky cable antenna and transmitting a first object detection signal;

at least one receiver electronically coupled to said at least one leaky cable antenna and receiving a second object detection signal formed by reflection of said first object detection signal on at least one object; and a controller electrically coupled to said at least one transmitter and said at least one receiver and generating a countermeasure signal in response to said second object detection signal.

2. A system as in claim 1 further comprising said controller generating a pre-collision countermeasure signal in response to said second object detection signal.

3. A system as in claim 1 further comprising a transmission gear sensor generating a transmission gear signal, said at least one leaky cable system operating in a detection mode in response to said transmission gear signal.

4. A system as in claim 1 comprising:

a first transmitter electronically coupled to a first leaky cable antenna that is mounted in a forward portion of the vehicle, said first transmitter generating a first object detection signal;

a first receiver electronically coupled to said first leaky cable antenna and receiving a second object detection signal formed by reflection of said first object detection signal on at least one object;

a second transmitter electronically coupled to a second leaky cable antenna that is mounted in a rearward portion of the vehicle, said second transmitter generating a third object detection signal; and a second receiver electronically coupled to said second leaky cable antenna and receiving a fourth object detection signal formed by reflection of said third object detection signal on at least one object;

said controller electrically coupled to said first transmitter, said second transmitter, said first receiver, and said second receiver and generating said countermeasure signal in response to said second object detection signal and said fourth object detection signal.

5. A system as in claim 4 wherein said controller in generating said countermeasure signal generates a slow vehicle traveling velocity countermeasure signal, a parking-aid countermeasure signal, a reversing-aid countermeasure signal, or a pre-collision countermeasure signal in response to said fourth object detection signal.

6. A system as in claim 1 wherein said first object detection signal is transmitted at an approximate frequency level of 5.8 GHz.

7. A system as in claim 1 wherein said at least one leaky cable is coupled within at least one bumper of the vehicle.

8. A system as in claim 1 wherein said at least one leaky cable has a plurality of radiating elements which at least a portion thereof are mounted as to direct transmission of object detection signals between the vehicle and surrounding objects.

9. A system as in claim 1 further comprising:
a pulse generator electrically coupled to said at least one transmitter and generating a pulsed signal;
a modulator electrically coupled to said pulse generator and generating said first object detection signal in response to said pulsed signal; and
a synchronous detector electrically coupled to said at least one receiver and generating an in-phase signal and a quadrature signal in response to said second object detection signal;
said controller electrically coupled to said synchronous detector and generating said countermeasure signal in response to said in-phase signal and said quadrature signal.

10. A system as in claim 1 wherein said at least one transmitter is continuously transmitting said first object detection signal while operating in at least one mode.

11. A system as in claim 1 wherein said at least one leaky cable system is operated in at least one mode.

12. A system as in claim 11 wherein said at least one leaky cable in operating in at least one mode is continuously operating in a parking-aid mode and a pre-collision mode.

13. A system as in claim 1 further comprising a velocity sensor generating a vehicle velocity signal and said controller determining object detection mode in response to said vehicle velocity signal.

14. A system as in claim 1 further comprising an indicator electrically coupled to said controller, said controller indicating said countermeasure signal via said indicator.

15. A system as in claim 1 wherein leaky cable system transmission components are shared between a forward leaky cable system and a rearward leaky cable system.

16. A system as in claim 1 wherein a first leaky cable is used for transmission of said first object detection signal and a second leaky cable is used for reception of said second object detection signal.

17. A system as in claim 1 wherein a single leaky cable is used for both transmission of the first object detection signal and for reception of said second object detection signal.

18. A system as in claim 1 further comprising a multiplexer electrically coupled to a plurality of transmitters and to said controller and multiplexing multiple object detection signals.

19. A method of performing object detection within a vehicle comprising:
transmitting a first object detection signal via at least one leaky cable antenna;
receiving a second object detection signal formed by reflection of said first object detection signal on at least one object via said at least one leaky cable antenna; and
generating a countermeasure signal in response to said second object detection signal.

20. A leaky cable object detection system for a vehicle comprising:
a transmission gear sensor generating a transmission gear signal;
at least one transmitter coupled to at least one leaky cable antenna within at least one bumper of the vehicle, said at least one transmitter transmitting a first object detection signal and operating in a detection mode in response to the said transmission gear;
at least one receiver electrically coupled to said at least one leaky cable receiving a second object detection signal formed by reflection of said first object detection signal on at least one object; and
a controller electrically coupled to said at least one transmitter and said at least one receiver and generating a slow vehicle traveling velocity countermeasure signal and a pre-collision countermeasure signal in response to said second object detection signal.

* * * * *